US012767053B2

(12) United States Patent
Sánchez Montoya et al.

(10) Patent No.: US 12,767,053 B2
(45) Date of Patent: Oct. 20, 2026

(54) VEHICLE HAVING POWER RUNNING BOARD WITH USER PROFILE

(71) Applicant: Ford Global Technologies, LLC, Dearborn, MI (US)

(72) Inventors: Adrian Sánchez Montoya, Teoloyucan (MX); Mauricio Luevano Lozano, Mexico City (MX); Carlos Yeudiel Corona Ruiz, Cuautitlán Izcalli (MX); Litzahaya Tzitzintly Salas Garcia, Estado de Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 18/644,191

(22) Filed: Apr. 24, 2024

(65) Prior Publication Data

US 2025/0332997 A1 Oct. 30, 2025

(51) Int. Cl.
*B60R 3/02* (2006.01)

(52) U.S. Cl.
CPC .................................... *B60R 3/02* (2013.01)

(58) Field of Classification Search
CPC ......... B60R 3/002; B60R 3/02; B60R 16/037; B60R 25/2018; B60R 25/241; B60R 25/25
USPC ........................................................ 280/166
See application file for complete search history.

(56) References Cited

U.S. PATENT DOCUMENTS

| | | | | |
|---|---|---|---|---|
| 7,070,194 | B2 * | 7/2006 | Garland | B60R 3/002 280/166 |
| 9,275,208 | B2 * | 3/2016 | Protopapas | G06F 21/31 |
| 10,225,350 | B2 * | 3/2019 | Penilla | B60L 53/80 |
| 11,458,900 | B2 * | 10/2022 | Watson | B60R 3/002 |
| 11,987,207 | B2 * | 5/2024 | Williams | B60R 25/104 |
| 12,090,959 | B2 * | 9/2024 | Salter | B60R 16/037 |
| 2013/0111403 | A1 | 5/2013 | Nakamura | |
| 2014/0344951 | A1 * | 11/2014 | Brewer | G06F 21/629 726/28 |
| 2017/0091849 | A1 * | 3/2017 | Greystoke | G06Q 30/0631 |
| 2023/0103458 | A1 * | 4/2023 | Williams | B60R 3/002 701/49 |
| 2023/0256909 | A1 * | 8/2023 | Salter | B60R 3/02 280/166 |
| 2023/0294608 | A1 * | 9/2023 | Gaither | B60R 3/02 280/166 |
| 2023/0398937 | A1 * | 12/2023 | Harkleroad | B60R 3/002 |

FOREIGN PATENT DOCUMENTS

| | | |
|---|---|---|
| CN | 216184922 U | 4/2022 |

* cited by examiner

*Primary Examiner* — James A Shriver, II
*Assistant Examiner* — Hilary L Johns
(74) *Attorney, Agent, or Firm* — Vichit Chea; Price Heneveld LLP

(57) ABSTRACT

A vehicle having a passenger compartment, one or more doors to allow access to the passenger compartment, and a power running board located proximate to the one or more doors. The power running board is deployable to a first deployed position and a second deployed position. The vehicle also includes a controller configured to control the power running board to move the power running board between a stowed position and one of the first and second deployed positions based on a user profile.

15 Claims, 4 Drawing Sheets

VEHICLE HAVING POWER RUNNING BOARD WITH USER PROFILE

FIELD OF THE DISCLOSURE

The present disclosure generally relates to deployable power running boards on a motor vehicle, and more particularly relates to a vehicle power running board that is selectably deployed for a user.

BACKGROUND OF THE DISCLOSURE

Motor vehicles such as SUVs and trucks, for example, commonly are equipped with power running boards proximate to vehicle doorways. The power running boards may be actuatable between a stowed position against the vehicle body and an outward deployed position to provide a step for an occupant entering or leaving the vehicle. It would be desirable to provide for a vehicle power running board that may be actuated to a deployed position based on a user profile.

SUMMARY OF THE DISCLOSURE

According to a first aspect of the present disclosure, a vehicle comprising a passenger compartment, one or more doors to allow access to the passenger compartment, a power running board located proximate to the one or more doors, wherein the power running board is deployable to a first deployed position and a second deployed position, and a controller configured to control the power running board to move the power running board between a stowed position and one of the first and second deployed positions based on a user profile.

Embodiments of the first aspect of the present disclosure can include any one or a combination of the following features:

- the user profile comprises a child profile mode for a short user;
- the power running board includes a first step and a second step, wherein the second step in the second deployed position is lower than the first step;
- the second step is deployed when the child profile mode is selected;
- a user input configured to select the child mode for controlling the power running boards;
- the user input is a touchscreen display;
- one or more door sensors for sensing at least one of the one or more doors in the open position, wherein the controller activates the power running board to one of the first and second deployed positions when the at least one of the one or more doors is sensed open;
- the power running board has one or more actuators;
- the user profile comprises an adult profile mode for a tall user;
- the power running board has a first upper step that deploys in the adult mode and a second running step that deploys in the child mode; and
- the power running board comprises a first running board proximate to a first door and a second running board proximate to a second door.

According to a second aspect of the present disclosure, a motor vehicle comprising a passenger compartment, one or more doors to allow access to the passenger compartment, a power running board located proximate to the one or more doors, wherein the power running board is deployable to a first deployed position in an adult profile mode for a tall user and a second deployed position in a child profile mode for a short user, and a controller configured to control the power running board to move the power running board between a stowed position and one of the first and second deployed positions based on a user profile being for the adult profile mode or the child profile mode.

Embodiments of the second aspect of the present disclosure can include any one or a combination of the following features:

- the power running board includes a first step and a second step, wherein the second step in the second deployed position is lower than the first step;
- the second step is deployed when the child profile mode is selected;
- a user input configured to select the child profile mode for controlling the power running boards;
- one or more door sensors for sensing at least one of the one or more doors in the open position, wherein the controller activates the power running board to one of the first and second deployed positions when the at least one of the one or more doors is sensed open;
- the power running board has one or more actuators;
- the power running board has a first upper step deployed in the adult profile mode and a second lower step deployed in the child profile mode; and
- the power running board comprises a first running board proximate to a first door and a second running board proximate to a second door.

The present disclosure also includes a method of controlling a power running board on a motor vehicle, the method comprising receiving a user profile indicating a selected adult profile mode for a tall user or a child profile mode for a short user, sensing a door open on the motor vehicle, and actuating the power running board to one of a first deployed upper step position and a second deployed lower step position based on the received user profile.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
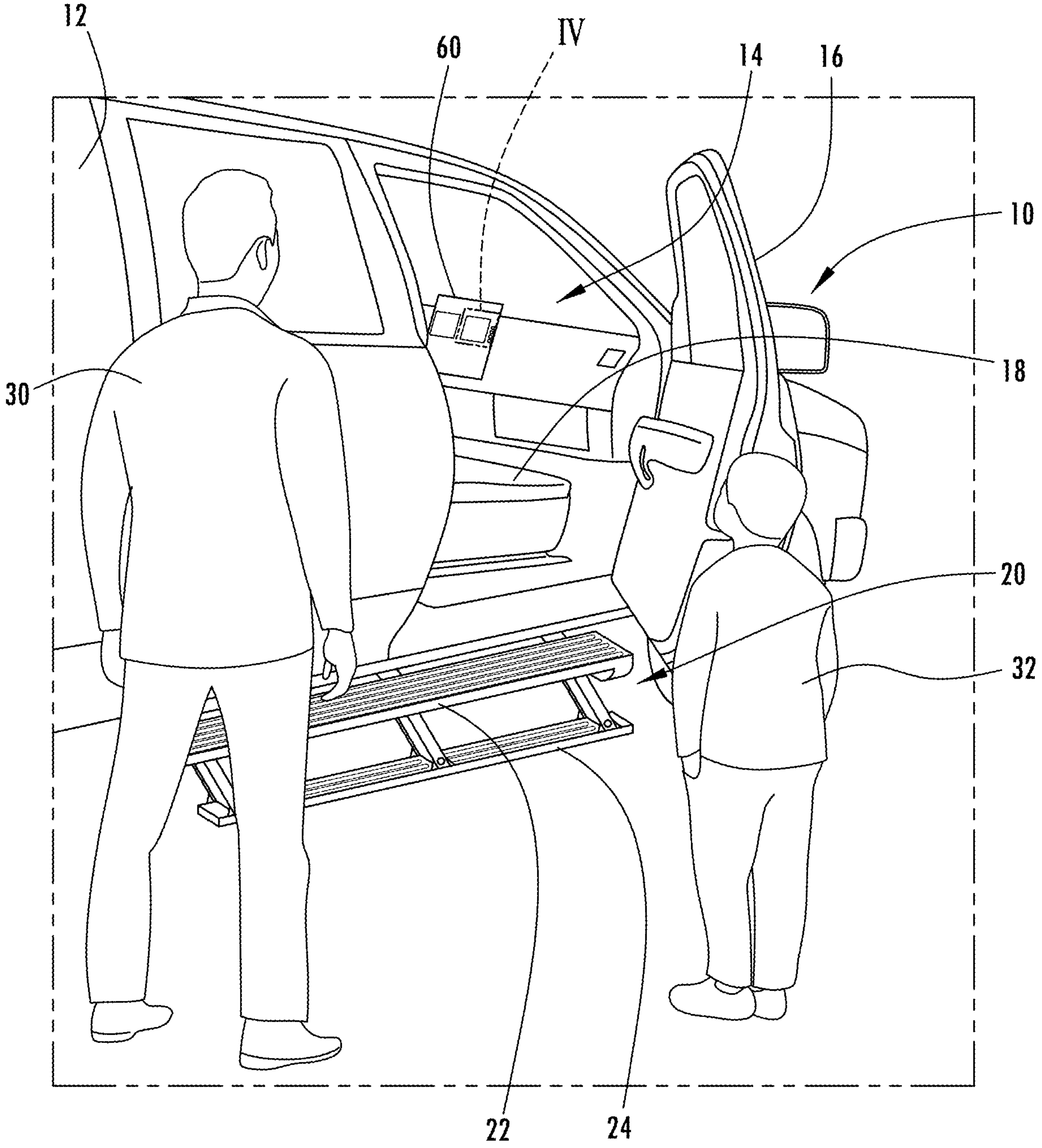
FIG. 1 is a side perspective view of a motor vehicle having a two-step power running board shown in a deployed position proximate an open door, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having power running boards with occupant selectable profiles. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
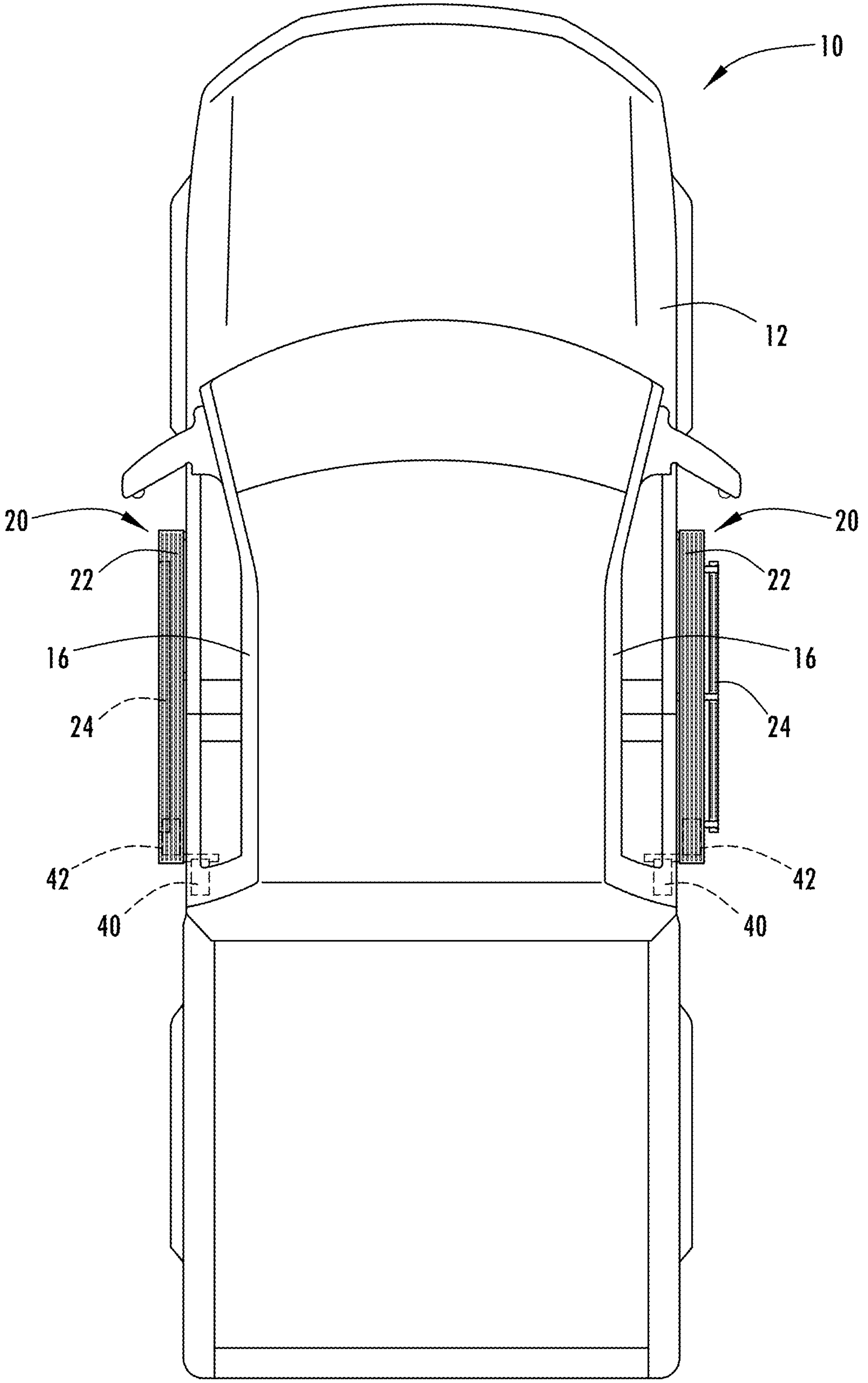
FIG. 2 is a top schematic view of the motor vehicle illustrating power running boards on opposite sides of the vehicle and in different deployed positions.

Referring to FIGS. 1 and 2, a motor vehicle 10 is generally illustrated equipped with a pair of power running boards on opposite sides that are deployable to assist users such as occupants when entering and leaving the motor vehicle 10. The motor vehicle 10 may be a wheeled motor vehicle having a plurality of road wheels that contact ground such as a roadway, and a vehicle body 12 generally defining an interior cabin of the vehicle which is referred to as a passenger compartment 14. The motor vehicle 10 is shown in one example as a pickup truck. However, it should be appreciated that the motor vehicle 10 may otherwise be configured as an SUV, a van, a bus, a crossover vehicle, a sedan or other motor vehicle that may employ one or more power running boards.

The motor vehicle 10 generally has the passenger compartment 14 configured with a seating arrangement that includes one or more seats 18 which may be arranged in a front row having a driver's seat and a passenger seat on opposite sides and one or more rear rows of seating. The motor vehicle 10 includes a plurality of doors which are shown located on both the left and right sides of the body 12. The doors 16 are located proximate to the rows of seating so as to allow access to the seating in the passenger compartment 14 when the door 16 is rotated about hinges to the open position as shown in FIG. 1. It should be appreciated that the body 12 on each of the left and right sides of the motor vehicle 10 may have one door, two doors or more than two doors.

The motor vehicle 10 is equipped with power running boards 20 shown in one example located on each of the left and right sides of the body 12 of the vehicle 10. The power running boards 20 are located proximate to and below the door entries which receive the doors 16 and are deployable between a stowed position proximate to the lower portion of the body 12 and a deployed position extending outward and downward to form a step as shown in FIG. 1. In the fully deployed position, each of the power running boards 20 enables one or more occupant users of different statures such as an adult 30 with a longer stature, e.g., height, and a child 32 with a smaller stature, e.g., height, to enter the passenger compartment 14 or to exit the passenger compartment 14. In the embodiment shown and described herein, the power running boards 20 in the fully deployed position advantageously allow the user to utilize one or two steps when moving between ground and the passenger compartment 14.

The power running boards 20 as shown and described herein in one embodiment are configured as a two-step power running board having a first upper step 22 and a second lower step 24. The upper step 22 is deployable from a stowed position against or under a lower portion of the body 12 and the outward and lowered step position as seen in FIG. 1. The lower step 24 is likewise deployable between the stowed position proximate to or under the lower portion of the body 12 and a deployed position extending further outward and downward from the lower step 24, as seen in FIG. 1. The upper step 22 is powered with a first actuator 40 which may include an electric motor and drive linkages, for example, that drive the upper step 22 between the fully stowed position and the first deployed position. It should be appreciated that the electric motor 40 may actuate both the upper step 22 and the lower step 24 to the first deployed position while the lower step 24 is stowed below and not outwardly extending from the upper step 22. The lower step 24 further has a second actuator such as an electric motor 42 which may actuate the second step 24 between the first deployed position stowed beneath the upper step 22 and an outward and lowered second deployed step position. It should be appreciated that the motor vehicle 10 has a controller that controls the deployment and stowage of the power running boards 20 from the fully stowed position to the first deployed position with the first step, and the second deployed position with the second step 24 further deployed. The controller may automatically deploy the power running boards 20 when one or more of the doors 16 are sensed via a door sensor in an open position and may stow the power running boards 20 when the one or more doors 16 are all closed as sensed by the door position sensor.

It should be appreciated that the two-step power running board 20 allows for a taller user, such as an adult 30, to readily access the passenger compartment 14 by providing in the first deployed position a first upper step 22 to step upon. In addition, the lower step 24 when deployed to the second deployed position below the upper step 22 enables a shorter user, such as a child user 32, by providing both a lower step 24 and an upper step 22 to assist with access to or exit from the motor vehicle 10. While a specific two-step power running board 20 is shown in one embodiment, it should be appreciated that other power running boards may be employed according to other embodiments.

The motor vehicle 10 further has a human machine interface (HMI) that may be embodied in the form of a touch screen display 60, for example, located in the passenger compartment 14 and configured to be accessible to one or more users such as a driver of the motor vehicle 10. The touchscreen display 60 may provide input selections to select an operating mode for each of the power running boards 20 such as left side power running board, right side power running board, or both left and right side running boards and the selection may be dependent on one or more user profiles. A user, such as a driver of the motor vehicle 10, may enter the user profile for one or more occupants in the motor vehicle 10, such as whether an occupant is an adult or a child, for example, and may select the operating mode of each running board 20 on the corresponding side of the motor vehicle 10 proximate to the designated user. For example, if a short user such as a child is positioned on a seat on one side of the motor vehicle 10, the driver may enter a child profile mode such that the power running board 20 on that side of the motor vehicle 10 is actuated with both the first upper and second lower steps 22 and 24 extended in the second deployed position to help the shorter user such as a child enter and exit the vehicle 10. If there are no shorter users such as children seated within that side of the vehicle 10, the user profile may be the default mode which may be for an adult and the power running board 20 may only deploy to the first deployed upper step position with the first step 22 provided for gaining access to and exiting from the motor vehicle 10. It should be appreciated that the user profile may be entered for each side of the motor vehicle 10 or for each door such that the power running boards on either the left or right sides of the motor vehicle 10 may be controlled depending on the user profiles that are entered into the system for seats proximate thereto. It should be appreciated that other user inputs such as a microphone or input switches may be used to select a user profile. It should further be appreciated that the motor vehicle 10 may utilize sensors such as an imaging sensor on each side to determine a height of a user or identify a profile of a user and automatically select the operating mode of the corresponding power running board on that side of the motor vehicle 10.

Figure 3:
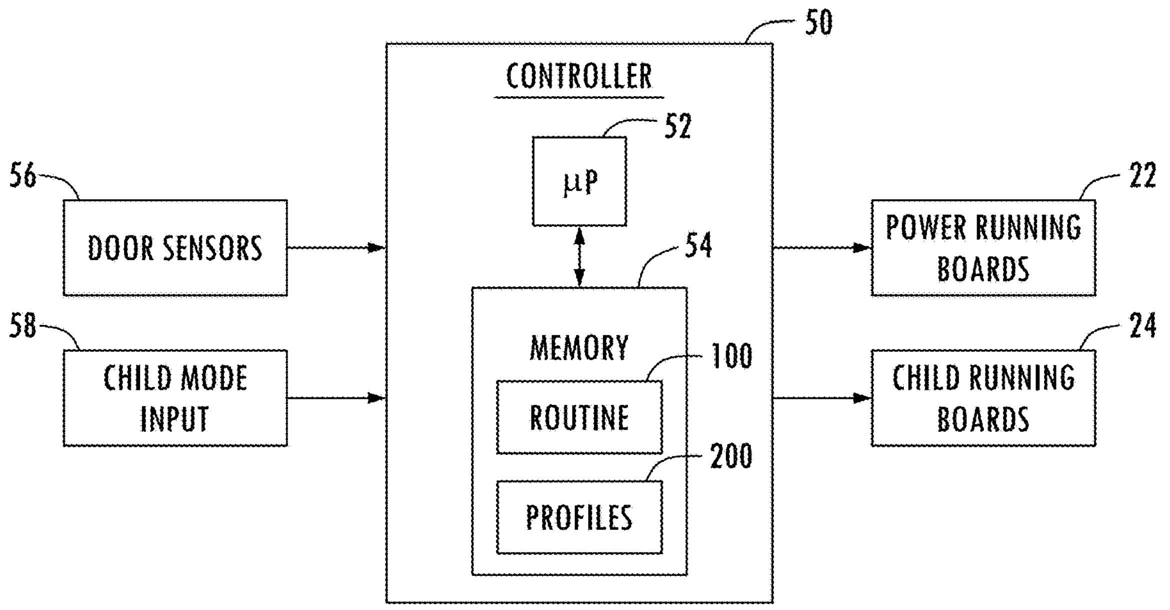
FIG. 3 is a block diagram illustrating the power running board controls for controlling the power running boards on the vehicle based on user selections.

Referring to FIG. 3, the power running board controls are shown having a controller 50 and may control both power running boards to deploy the first step 22 and to further deploy the child or lower step running boards for the second step 24. The controller 50 may include a microprocessor 52 and memory 54. The microprocessor 52 is one example of a digital controller, however, it should be appreciated that other analog and/or digital control circuitry may be employed. Stored within memory 54 and executed by microprocessor 52 is a control routine 100 for controlling actuation of the power running boards and their deployment to the first and second deployed positions for the upper and lower steps. In addition, user profiles 200 may be stored within the memory 54 and utilized to control the power running boards to determine if each power running board is for a taller user such as an adult or a shorter user such as a child. The controller 50 receives door sensor signals from door position sensors 56 and the child mode input 58 from the driver or other users of the motor vehicle 10 which may be entered into the touch screen display by a user. The controller 50 processes the door sensor signals and child mode input and controls the power running boards with upper and lower steps 22 and 24 to deploy the upper and lower steps when one or more doors are open and to deploy the lower step 24 when the child mode is selected as an input.

Figure 4:
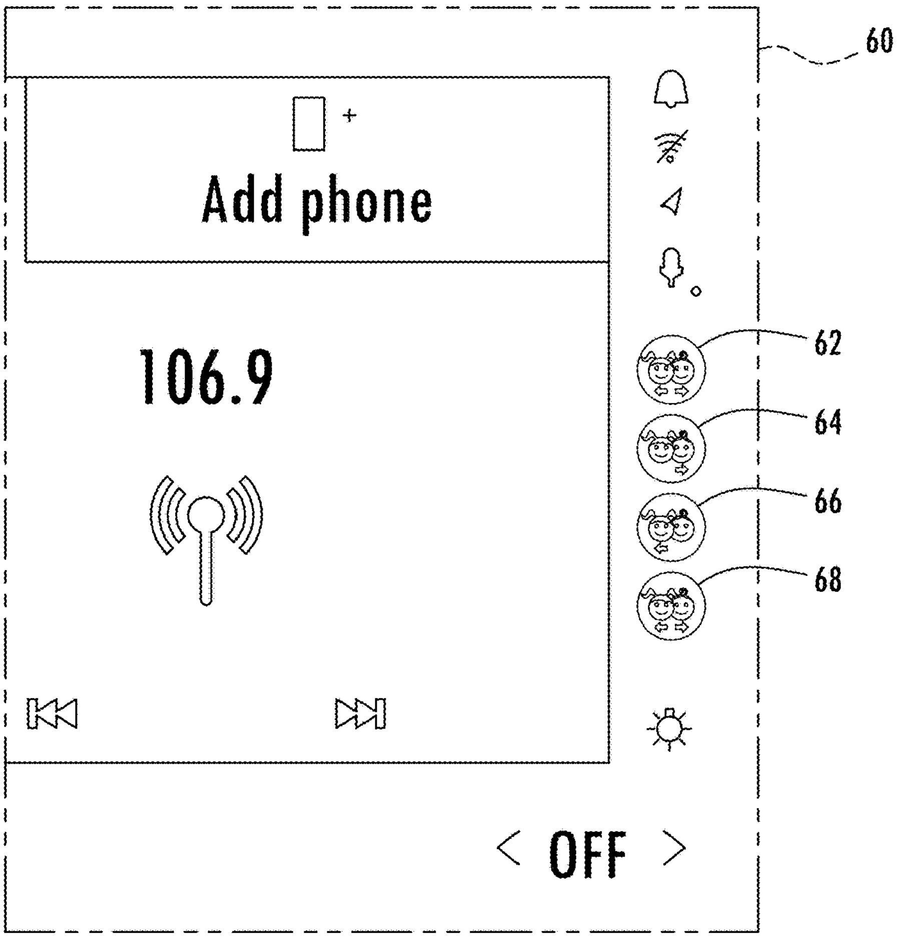
FIG. 4 is a screenshot of an HMI touch screen display in the vehicle illustrating various user inputs for selecting a child mode for controlling the running boards.

Referring to FIG. 4, one example of a screenshot of the touch screen display 60 with power running board input icons is illustrated. The touch screen display 60 may include a plurality of outputs and/or user selectable inputs shown as icons on the touch screen display 60 for displaying and/or selecting operating modes of the running boards for user profiles. For example, a first power running board input/output icon 62 may be entered to activate both the left and right side running boards for the child mode. Power running board input/output icon 64 may be selected to activate the child running board for the right side only, whereas power running board input/output icon 66 may be entered to activate the child running board for the left side only. Power running board input 68 may be selected when the power running board is to be disabled. It should be appreciated that the icons shown may include programmed profiles for the child mode. It should further be appreciated that individual profiles for individual users may be employed and used to control the power running boards.

Figure 5:
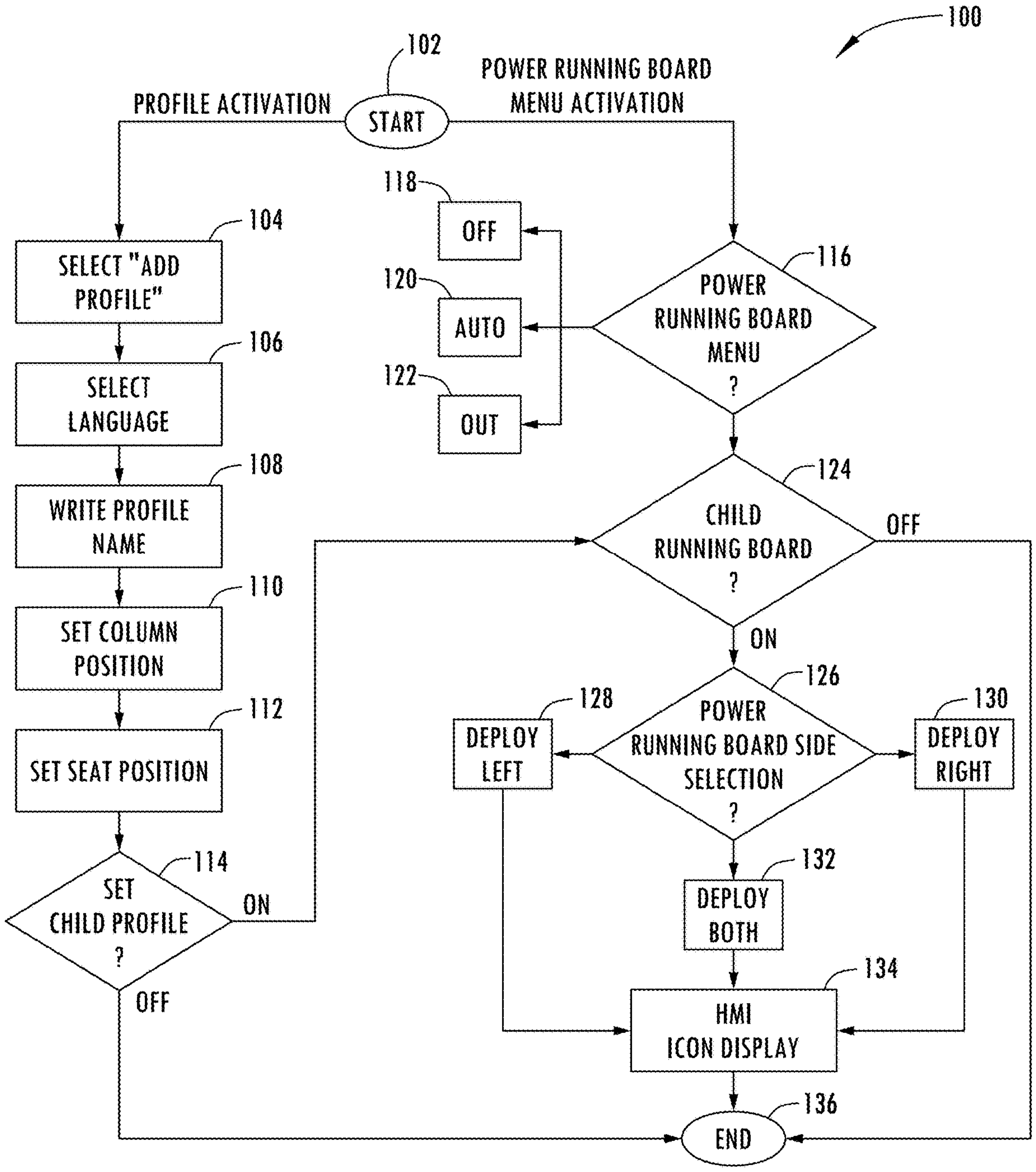
FIG. 5 is a flow diagram illustrating a routine for controlling the power running boards according to user profiles.

Referring to FIG. 5, the control routine 100 for controlling the power running boards is illustrated according to one example. Routine 100 starts at step 102 and proceeds to the profile activation at step 104 to select "ADD PROFILE" as an input, such as via the touchscreen display. Next, routine 100 proceeds to step 106 to select a language and to step 108 to write a profile name to be saved. Routine 100 then proceeds to step 110 to set the steering column position and to step 112 to set the seat position for personalized user preferences. Next, at decision step 114, routine 100 determines if the child profile is selected and, if not, ends at step 136. If the child profile is selected, routine 100 proceeds to determine if the child running board or second step is on or off.

It should be appreciated that the routine 100 may go through a power running board menu activation at decision step 116 to determine if the power running board menu is either off at step 118, in auto mode at step 120, or if the power running boards are extended or deployed out at step 122, before proceeding to child running board decision step 124. At decision step 124, routine 100 determines if the child running boards are off and, if so, routine 100 ends at step 136. If the child running board mode is on, routine 100 proceeds to decision step 126 to determine if the power running board side selection is left side, right side or deployment of both left and right side running boards. If the power running board side selection is left side at step 128, the left side power boards are deployed in the child mode. If the power running board side selection is for the right side only at step 130, the right side power boards are deployed to the child mode. If the power running board side selection is for deployment of both of the power running boards in the child mode, both running boards are deployed in the child mode at step 132. Following deployment of the child running boards to the child modes, routine 100 provides an HMI icon display at step 134. Once the mode is selected in either any of steps 128, 130 or 132, the HMI may display the selected icon 66, 64 or 62, before ending at step 136.

Accordingly, the motor vehicle 10 advantageously employs one or more power running boards 20 that offer an enhanced access step in a second deployed position for use with a shorter individual, such as a child. The child profile may be entered by a user of the motor vehicle 10 or otherwise identified and used to control the power running boards 20 to provide multiple possible deployed positions for adults and children.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a passenger compartment;

one or more doors to allow access to the passenger compartment;

a power running board located proximate to the one or more doors, wherein the power running board is deployable to a first deployed position and a second deployed position, wherein the power running board includes a first upper step actuatable by a first actuator and a second lower step independently actuatable by a second actuator; and a controller configured to control the power running board to move the power running board between a stowed position and one of the first and second deployed positions based on a user profile, wherein in a first profile mode for a first user, the first upper step is actuated by the first actuator to the first deployed position, and in a second profile mode for a second user, the second lower step is actuated by the second actuator to the second deployed position, wherein the first user has a taller height than the second user.

2. The vehicle of claim 1, wherein the second step in the second deployed position is lower than the first step.

3. The vehicle of claim 2, wherein the second step is deployed when the second profile mode is selected.

4. The vehicle of claim 3, further comprising a user input configured to select the second mode for controlling the power running boards.

5. The vehicle of claim 4, wherein the user input is a touchscreen display.

6. The vehicle of claim 1, further comprising one or more door sensors for sensing at least one of the one or more doors in the open position, wherein the controller activates the power running board to one of the first and second deployed positions when the at least one of the one or more doors is sensed open.

7. The vehicle of claim 1, wherein the user profile is used to select the first profile mode or the second profile mode.

8. The vehicle of claim 1, wherein the power running board comprises a first running board proximate to a first door and a second running board proximate to a second door.

9. A motor vehicle comprising:

a passenger compartment;

one or more doors to allow access to the passenger compartment;

a power running board located proximate to the one or more doors, wherein the power running board is deployable to a first deployed position in a first profile mode for a tall first user and a second deployed position in a second profile mode for a second user, wherein the power running board includes a first upper step actuatable by a first actuator and a second lower step independently actuatable by a second actuator, wherein the first user has a taller height than the second user; and a controller configured to control the power running board to move the power running board between a stowed position and one of the first and second deployed positions based on a user profile being for the first profile mode or the second profile mode, wherein in the first profile mode for the first user, the first upper step is actuated by the first actuator to the first deployed position, and in the second profile mode for the second user, the second lower step is actuated by the second actuator to the second deployed position.

10. The motor vehicle of claim 9, wherein the second step in the second deployed position is lower than the first step.

11. The motor vehicle of claim 10, wherein the second step is deployed when the second profile mode is selected.

12. The motor vehicle of claim 11, further comprising a user input configured to select the second profile mode for controlling the power running boards.

13. The motor vehicle of claim 9, further comprising one or more door sensors for sensing at least one of the one or more doors in the open position, wherein the controller activates the power running board to one of the first and second deployed positions when the at least one of the one or more doors is sensed open.

14. The motor vehicle of claim 9, wherein the power running board comprises a first running board proximate to a first door and a second running board proximate to a second door.

15. A method of controlling a power running board on a motor vehicle, the method comprising:

receiving a user profile indicating a selected first profile mode for a first user or a second profile mode for a second user, wherein the first user has a taller height than the second user;

sensing a door open on the motor vehicle; and actuating the power running board to one of a first deployed upper step position and a second deployed lower step position based on the received user profile, wherein the power running board includes a first upper step actuatable by a first actuator and a second lower step independently actuatable by a second actuator, and wherein in the first profile mode for the first user, the first upper step is actuated by the first actuator to the first deployed position, and in the second profile mode for the second user, the second lower step is actuated by the second actuator to the second deployed position.

* * * * *